(No Model.) 3 Sheets—Sheet 1.

G. WESTINGHOUSE, Jr.
SYSTEM OF ELECTRICAL DISTRIBUTION.

No. 404,139. Patented May 28, 1889.

Witnesses,
Geo. W. Breck
Carrie E. Ashley

Inventor,
Geo. Westinghouse Jr.
By his Attorneys
Pope & Edgecomb (No Model.) 3 Sheets—Sheet 3.

G. WESTINGHOUSE, Jr.
SYSTEM OF ELECTRICAL DISTRIBUTION.

No. 404,139. Patented May 28, 1889.

Witnesses
Geo. W. Breck.
Carrie E. Ashley

Inventor,
Geo. Westinghouse Jr.
By his Attorneys
Pope Edgcomb & Terry

UNITED STATES PATENT OFFICE.

GEORGE WESTINGHOUSE, JR., OF PITTSBURG, PENNSYLVANIA.

SYSTEM OF ELECTRICAL DISTRIBUTION.

SPECIFICATION forming part of Letters Patent No. 404,139, dated May 28, 1889.

Application filed February 28, 1887. Serial No. 229,103. (No model.)

*To all whom it may concern:*

Be it known that I, GEORGE WESTINGHOUSE, Jr., a citizen of the United States, residing in Pittsburg, in the county of Allegheny and State of Pennsylvania, have invented certain new and useful improvements in Systems of Electrical Distribution, of which the following is a specification.

The invention relates to certain improvements in the employment of electric currents for actuating electric locomotors.

The object of the invention is to provide convenient and reliable means for supplying to electric railways continuous currents derived from alternating electric currents generated at more or less remote points and transmitted as alternating currents to points at or near the place where they are to be delivered to the locomotor, and to thus provide for the running of railway-cars by means of currents of low potential, which are derived from the high-potential apparatus located at some convenient central station, it being well known that only a low-potential current can be safely used where persons and animals are liable to come in contact with the conductors.

The invention consists, generally, in employing, in connection with an alternate-current electric generator, a circuit extending to a point in the vicinity of the railway, preferably along the line of the track, and in transmitting currents of high potential over this circuit and transforming them into currents of lower potential at various points along the line of the track, and in straightening or rectifying the currents thus converted, and in delivering the rectified currents to the motor. For the purpose of thus rectifying the currents, a suitable electric motor is employed, and this is driven at a rate synchronous with the alternations in the current. This motor carries a rectifying-commutator whose circuit-connections are with the conductors delivering the currents to the locomotor.

For the purpose of providing a reserve supply of current, which may be used when desired in case the generator should fail, a storage-battery may be employed for receiving a charge from the surplus current, or from the current which is delivered when the track-section supplied therefrom is not in use.

Figure 1:
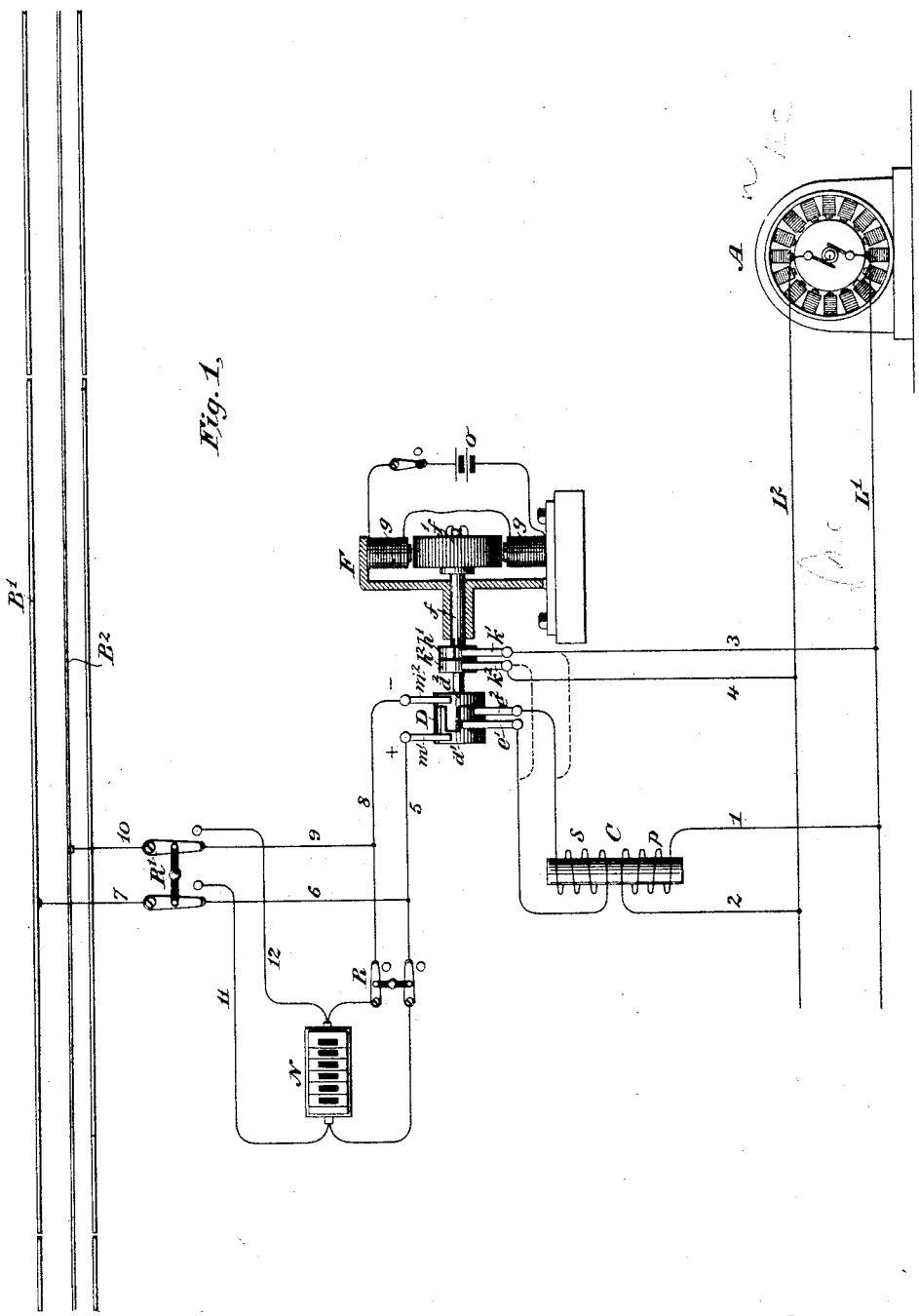
Figure 2:
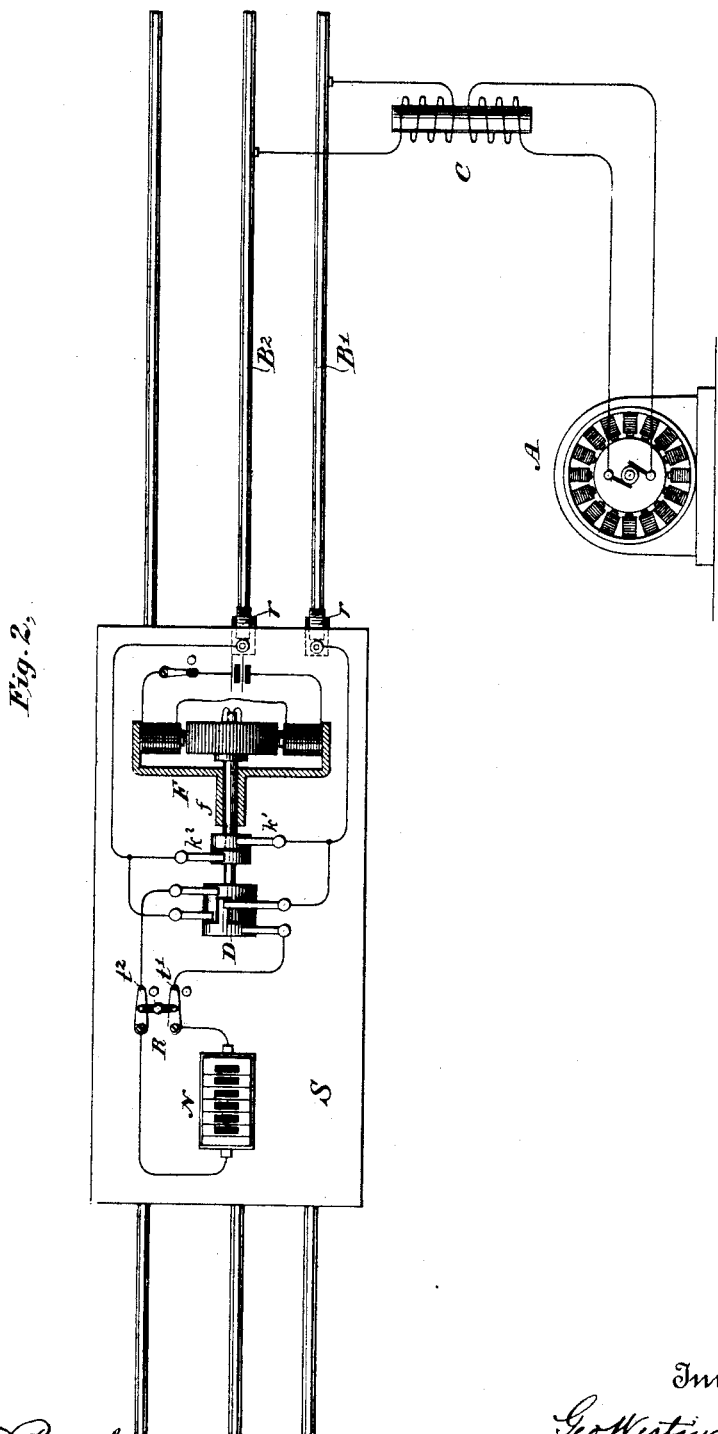
Figure 3:
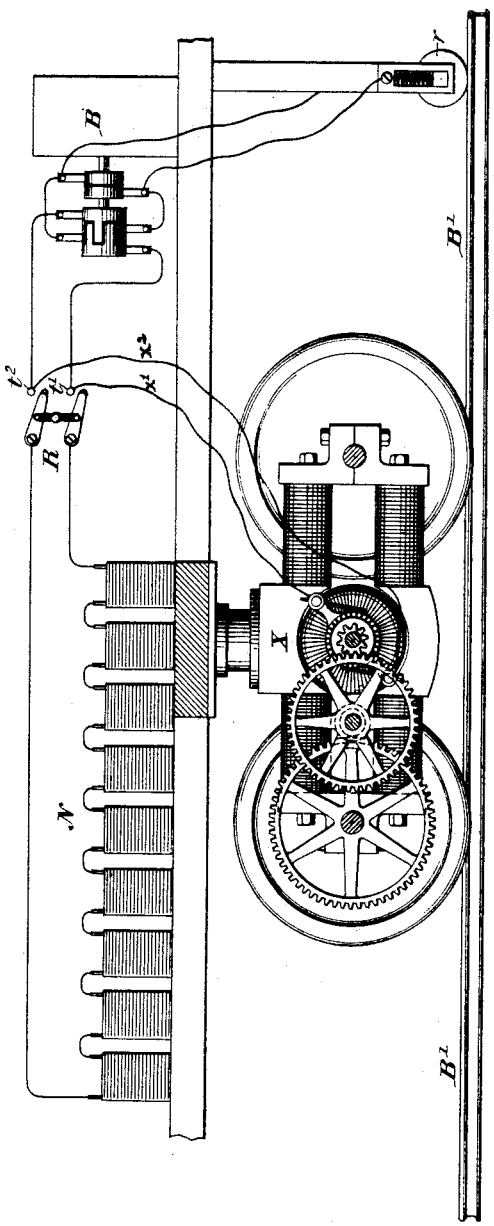

In the accompanying drawings, Figure 1 is a diagram illustrating the general organization of circuits and apparatus adapted to carrying out the invention. Figs. 2 and 3 illustrate a modified organization.

Referring to Fig. 1, A represents a suitable form of alternate-current electric generator. This generator has its circuit $L'$ $L^2$ extending along the vicinity of a railway-track, $B'$ $B^2$, which is constructed in insulated sections, or in any other convenient manner for delivering currents to an electric locomotor designed to be impelled along the track. The generator A preferably delivers currents of high potential, and such currents may be conveyed upon conductors of small cross-section. It is desired, however, to reduce this potential before the currents are delivered to the track, and to accomplish this the primary coil $p$ of an electric converter, C, is included in parallel circuit between the conductors $L'$ and $L^2$ by means of conductors 1 and 2. The secondary coil $s$ of this converter has its terminals in two contact-brushes, $e'$ and $e^2$, adapted to make contact alternately with the insulated contact-plates $d'$ and $d^2$ of a rectifying-commutator, D. The commutator D is carried upon the shaft $f$ of an alternate-current electric motor, F. This motor may conveniently consist of field-magnets $g$ $g$, which may be either permanent magnets or electro-magnets vitalized by a current from a local battery, $o$, or otherwise. Within the field of force created by these magnets an armature, $f'$, is placed. The terminals of the coils of this armature are connected with two contact-rings, $h'$ and $h^2$, respectively, provided with contact-brushes $k'$ and $k^2$. These brushes are respectively connected by conductors 3 and 4 with the main lines $L'$ and $L^2$. A current will thus be derived from these main lines and delivered through the rings $h'$ and $h^2$ to the armature. This current will be an alternating current, and will cause the armature $f$ to revolve at a rate dependent upon the number of alternations per minute. This will insure that the commutator D, which, it is assumed, is correctly proportioned, shall revolve at the required rate to cause the plates $d'$ and $d^2$ to reverse their positions with reference to the brushes $e'$ and $e^2$ at each alternation of the current. Currents continuous in direction will thus be delivered to the plates $d'$ and $d^2$, and these currents are collected by brushes $m'$ and $m^2$, respectively, making permanent contact with the plates $d'$ and $d^2$. The brushes $m'$ and $m^2$ are respectively connected by conductors 5 6 7 and 8 9 10 with two track-rails, B' and B², and in this manner a current continuous in direction will be supplied to the sections of the track.

It is designed that the respective sections which are to be supplied shall be each equipped with an apparatus of the character described for rectifying the currents, though it is evident that more than one section may be supplied from a single rectifying-commutator, if desired.

For the purpose of storing up whatever current may otherwise be wasted, and also providing a reserve, a storage-battery, N, may be employed. This, if used, is designed to be placed in connection with the conductors 5 and 8, respectively, by means of a switch, R, which is capable of continuing the connections from the respective poles of the storage-battery to the two conductors 5 and 8 when desired. The manner of charging the battery will be well understood.

A switch, R', is inserted between the conductors 6 7 and 9 10, whereby the respective poles of the storage-battery N may be connected, through the conductors 11 and 12, with the conductors 7 and 10, and the connections with the conductors 6 and 9 at the same time interrupted when it is desired to employ the current from the storage-battery.

In some instances it may be desired to derive a current for the armature $f$ of the alternate-current motor from the secondary coil of the converter C. This may be accomplished by connecting the conductors leading therefrom with the brushes $k'$ and $k^2$, as indicated in dotted lines.

In Figs. 2 and 3 there is illustrated an organization in which the rectifier and the storage-battery are placed upon the locomotor S. The alternating currents are conveyed through the rails to the moving vehicle by means of rollers $r$ $r$, or in any other convenient manner. The rectified currents are delivered to contact-points $t'$ $t^2$, from whence they may be delivered, through conductors $x'$ $x^2$, to a suitable motor, X, for driving the vehicle. It is evident that the currents may be converted two or more times, if desirable.

The currents may be supplied through overhead or other conductors than the rails.

In another application filed by me February 4, 1887, Serial No. 226,498, there is described a system of circuits in some respects resembling that shown herein, whereby a storage-battery is applied to an electric-lighting system, and this battery is organized to be charged by currents rectified through the instrumentality of an alternate-current electric motor.

I claim as my invention—

1. The combination, substantially as described, of an alternate-current electric generator, a converter having primary and secondary circuits, the primary circuit being connected with the generator, an electric motor, an electric railway, and a rectifying-commutator driven by said motor, through which currents from said secondary circuit are supplied to said railway.

2. The combination, substantially as described, of an electric generator delivering alternating electric currents, an alternate-current motor driven thereby, a rectifying-commutator rendering continuous the current delivered from said generator, or a portion of the same, and an electric railway supplied by such continuous current.

3. The combination of an alternate-current electric generator, a converter reducing the potential of the currents delivered thereby, a rectifying commutator rendering continuous such reduced currents, and an electric railway supplied by such continuous currents.

4. The combination, substantially as hereinbefore set forth, of an alternate-current electric generator, a converter supplied with currents therefrom, a rectifying-commutator straightening the currents from said converter, an electric railway supplied with such rectified currents, and a storage-battery charged by currents from said rectifying-commutator.

5. The combination of an electric railway, an electric locomotor moving thereon, a source of alternating electric currents, an electric converter having its primary connected with the source, a current-rectifier with which the secondary of the converter is connected, and means for conveying currents from said rectifier to said locomotor.

6. The combination of an electric locomotor, a current-rectifier upon said locomotor, a source of alternating electric currents, and means for connecting said source with said rectifier.

7. The combination, with an electric locomotor, of a current-rectifier and a storage-battery carried thereby, circuit-connections from said rectifier to said storage-battery, whereby the battery may be charged by currents delivered through said rectifier, and electrical connections from the storage-battery with the electrical locomotor.

8. The combination of an electric motor, a vehicle carrying the same, a source of alternating electric currents, and a rectifying-commutator through which currents are delivered from said source to said motor.

In testimony whereof I have hereunto subscribed my name this 9th day of December, A. D. 1886.

GEO. WESTINGHOUSE, JR.

Witnesses:
  WALTER D. UPTEGRAFF,
  CHARLES A. TERRY.